US010221781B1

(12) United States Patent
Hussain

(10) Patent No.: US 10,221,781 B1
(45) Date of Patent: Mar. 5, 2019

(54) HYBRID VEHICLE WITH TURBO LAG REDUCTION APPARATUS

(71) Applicant: FORD GLOBAL TECHNOLOGIES, LLC, Dearborn, MI (US)

(72) Inventor: Quazi Ehtesham Hussain, Holland, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/782,739

(22) Filed: Oct. 12, 2017

(51) Int. Cl.
| | | |
|---|---|---|
| F02B 37/10 | (2006.01) |
| F02B 37/14 | (2006.01) |
| F02B 21/00 | (2006.01) |
| B60W 20/19 | (2016.01) |
| F02M 23/08 | (2006.01) |
| F02D 21/10 | (2006.01) |
| F02D 41/10 | (2006.01) |
| F02B 33/44 | (2006.01) |
| F02D 41/00 | (2006.01) |

(52) U.S. Cl.
CPC ............. *F02D 21/10* (2013.01); *F02B 33/44* (2013.01); *F02B 37/10* (2013.01); *F02D 41/0007* (2013.01); *F02D 41/10* (2013.01); *F02D 2200/602* (2013.01)

(58) Field of Classification Search
CPC .......... F02B 37/10; F02B 37/14; F02B 21/00; B60W 20/19; F02M 23/08; B60Y 2400/15; B60Y 2400/435
See application file for complete search history.

(56) References Cited

U.S. PATENT DOCUMENTS

| | | | |
|---|---|---|---|
| 5,819,538 A | 10/1998 | Lawson, Jr. | |
| 8,412,424 B2 | 4/2013 | Schaffeld et al. | |
| 2010/0314186 A1* | 12/2010 | Ma .......................... | B60K 6/12 180/165 |
| 2010/0318268 A1* | 12/2010 | Jager ..................... | B60W 10/06 701/54 |
| 2011/0083646 A1 | 4/2011 | Siuchta et al. | |

FOREIGN PATENT DOCUMENTS

DE  102015116162  3/2017

* cited by examiner

*Primary Examiner* — Bryan A Evans
(74) *Attorney, Agent, or Firm* — David Kelley; Brooks Kushman P.C.

(57) ABSTRACT

A hybrid electric vehicle includes a combustion engine, electric machine, turbocharger, and turbo lag reduction assembly that includes an auxiliary compressor and pressure tank, which are coupled to a clutch driven by a driveshaft powered by vehicle wheel rotation. A controller engages the clutch in response to a braking signal, until the auxiliary compressor recharges the pressure tank. The controller also disengages the clutch in response to one of termination of the braking signal and the pressure tank being recharged with compressed air. Additionally, the controller responds to an engine torque demand signal and discharges compressed air from the pressure tank to an intake manifold of the engine. Further, the controller may discharge a volume of compressed air from the pressure tank to the intake manifold of the engine, until a turbo charge limit signal is received that indicates the turbocharger reached an operating speed.

19 Claims, 2 Drawing Sheets

HYBRID VEHICLE WITH TURBO LAG REDUCTION APPARATUS

TECHNICAL FIELD

The disclosure relates to turbo charged engine and electric machine systems and methods for conventional and hybrid electric vehicles.

BACKGROUND

Hybrid electric vehicle (HEVs) typically include an internal combustion engine (ICE) coupled with an electric machine or motor/generator (EM), and include various other components including ICE turbochargers. Such HEVs may further include turbocharger lag reduction systems that reduce the amount of time needed for turbochargers to attain operational speeds. Such lag reduction systems sometimes include pressure tanks that store compressed air, which can be discharged to quickly ramp up the speed of the turbochargers to improve vehicle performance. In the past, such pressure tanks have been recharged utilizing energy from the ICE, EM, and/or batteries. However, hybrid electric vehicles may require recharge of the pressure tank when the ICE is shutdown during electric only operations, and without consuming power from the EM and batteries.

SUMMARY

The present disclosure enables improved HEV responsiveness and performance during electric only and transitions between and dual operation of electric and ICE systems, by enabling recharge of a turbo lag reduction assembly having an auxiliary compressor that charges a pressure tank utilizing energy recovered from vehicle wheel rotation during braking, and by discharge of pressurized air from the tank to reduce turbo spool-up lag in response to torque demands.

An HEV contemplated herein includes the internal combustion engine (ICE), and an electric machine and/or motor/generator (EM) and storage battery(ies), the turbocharger, and the turbo lag reduction assembly having a pressure tank and an auxiliary compressor driven by a clutch that engages a driveshaft. The clutch may be engaged during vehicle braking, such that energy is recovered from the rotating vehicle wheels without consuming power from the battery, ICE, EM, and/or without otherwise impacting HEV performance, such as ICE back pressure, during recharge of the pressure tank. The turbocharger typically may include an engine exhaust gas turbine driven by ICE exhaust gas flow, which is rotationally coupled to and powers an engine intake compressor turbine that injects compressed air downstream into an ICE air intake manifold.

It may be understood by those with knowledge of the technology that there is a time delay between a demand for power from the ICE, and when the turbocharger reaches a desired operational speed. The ICE power demand is followed by increased air and fuel delivery to the ICE, which starts a cycle of spooling up the turbocharger to a desired speed: more air and fuel increases ICE exhaust gas delivered to the turbocharger exhaust turbine, which then increases the speed of the intake compressor turbine, delivering increased air mass to the ICE, which increase exhaust gases further, and so on.

The pressure tank may be configured with a capacity to store energy with a predetermined volume and pressure of compressed air, and to discharge the stored compressed air to increase the air mass flow rate of an engine air intake, such as one or both of the turbocharger compressor intake and exhaust turbines, and/or downstream of the compressor and directly into the engine air intake manifold, and combinations thereof. In some arrangements, additional valves may be included (not shown) to selectively adjust discharge to one or both or all of the intakes, and may also be adapted to also further discharge the compressed air to the exhaust gas turbine.

These components are coupled to one or more controller(s) that are configured to respond to various signals from a driver and vehicle components, such as for example, braking and torque demand signals, among others. In response, such controller(s) are configured to engage the clutch in response to a braking signal (BS), and until one or more of BS is terminated and/or the compressor recharges the pressure tank. When the pressure tank is recharged to capacity with pressurized air and/or when BS terminates, the controller disengages the clutch.

During operation, the controller is also responsive to an engine torque demand signal to discharge compressed air from the pressure tank to an engine air intake, such as an intake manifold of the engine and/or an intake compressor turbine of the turbocharger. The controller discharges a volume of compressed air from the pressure tank to an engine air intake, such as an intake manifold of the engine and/or the turbocharger intake compressor, until a turbo charge limit signal is received, which signal may indicate that the turbocharger has attained operational speeds and/or desired performance capabilities.

The controller may also during such discharge operations, discharge the compressed air from the pressure tank with a predetermined volume and pressure and/or for a predetermined time span, which may be established by a predetermined, predicted, and/or preselected turbo time lag parameter that may results from instantaneous engine and environmental parameters, among other variables, characteristics, and/or data. Additionally, the predetermined volume and pressure and/or time span may be further established by one of current and historical parameters of the engine, turbocharger, vehicle performance, and/or past, present, and predicted environmental conditions.

During electric only and/or transitional operations, the controller also may respond to a torque demand signal that exceeds electric only and/or EM output capacity. In response, the controller may (a) adjust the EM output torque to spin the ICE or engine to a target speed, (b) initiate engine combustion in response to attaining the target speed, and/or (c) discharge a volume of compressed air from the pressure tank to an engine air intake, such as one or more of the intake manifold of the engine and/or the intake compressor of the turbocharger, once combustion is initiated, and until the turbo charge limit signal is received. During operations when the ICE is running without turbocharging, and in response to a torque demand that exceeds power available from the ICE and/or EM, such as during vehicle passing, highway driving, and/or other high performance operations, the controller may also discharge pressurized air from the tank to enable turbocharger spool-up and turbo lag reduction.

The disclosure further contemplates methods of controlling the HEV utilizing the described components and systems. For example, controlling the HEV may include, at least one controller engaging the clutch in response to BS, until the auxiliary compressor recharges the pressure tank, and discharging the pressure tank to one of the engine intake manifold and/or the intake compressor and/or exhaust turbines, in response to one or more signals, such as the torque demand signal exceeding electric machine capacity. The at least one controller may also further respond to the torque demand signal during electric only operation exceeding EM output capacity, and adjust the EM output torque to spin the engine to the target speed, initiate engine combustion in response to attaining the target speed, and/or discharge the volume and pressure of compressed air from the pressure tank to the engine and/or turbine intake once combustion is initiated, and until the turbo charge limit signal and/or other signals are received.

Such methods of controlling the HEV may further include discharging the compressed air from the pressure tank with a predetermined volume and pressure and/or for a predetermined time span, which volume and pressure and/or time may be established by a predetermined, predicted, and/or preselected turbo time lag that results from instantaneous engine and environmental parameters, characteristics, and variables. The predetermined volume may also be further established by one of current and historical parameters of the engine, turbocharger, and environmental conditions.

This summary of the implementations and configurations of the HEVs and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, nor is it intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

BRIEF DESCRIPTION OF THE DRAWINGS

A more complete understanding of example implementations of the present disclosure may be derived by referring to the detailed description and claims when considered with the following figures, wherein like reference numbers refer to similar or identical elements throughout the figures. The figures and annotations thereon are provided to facilitate understanding of the disclosure without limiting the breadth, scope, scale, or applicability of the disclosure. The drawings are not necessarily made to scale.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes that are illustrated and described with reference to any one of the figures may be combined with features, components, and processes illustrated in one or more other figures to produce embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
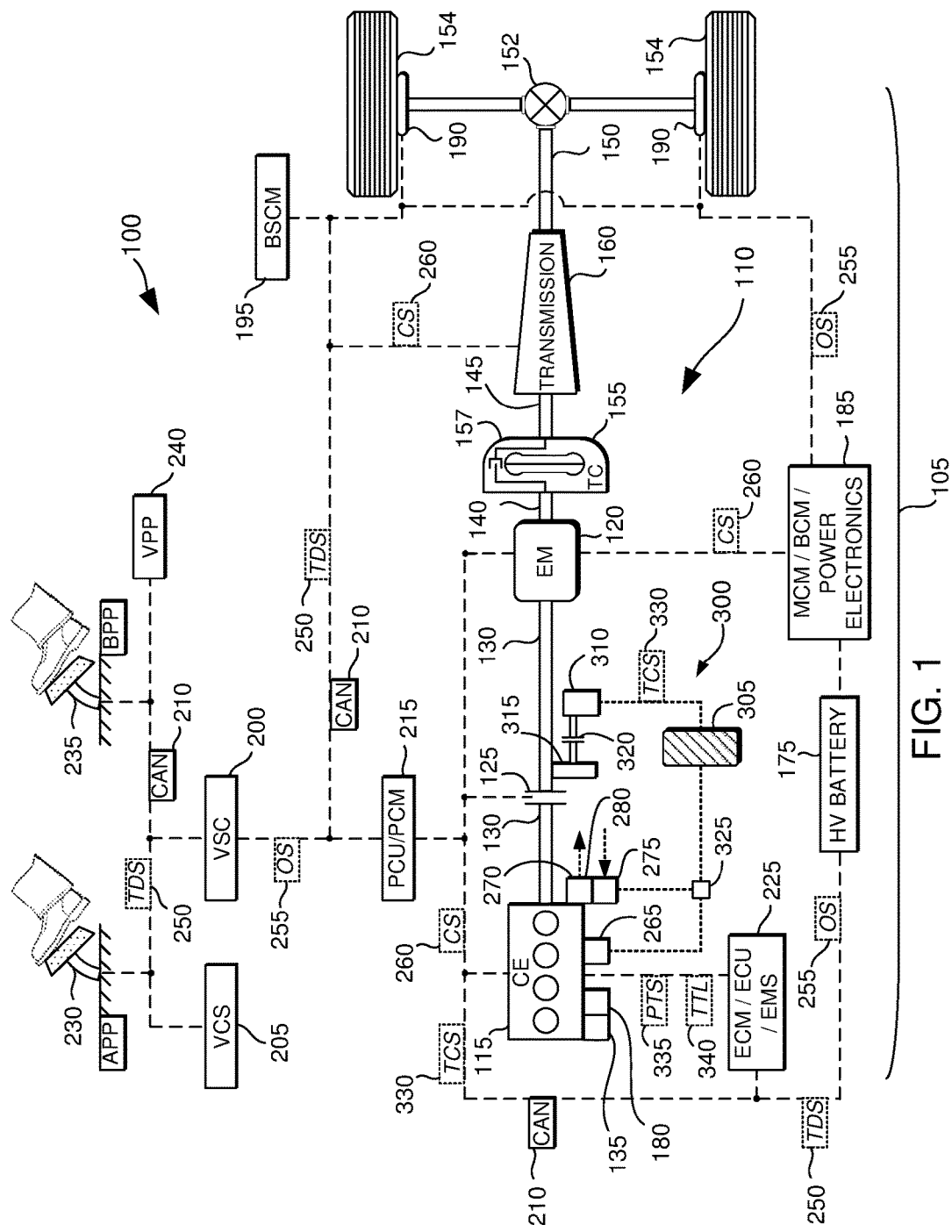
FIG. 1 is an illustration of a hybrid electric vehicle and its systems, components, sensors, actuators, and methods of operation.
Figure 2:
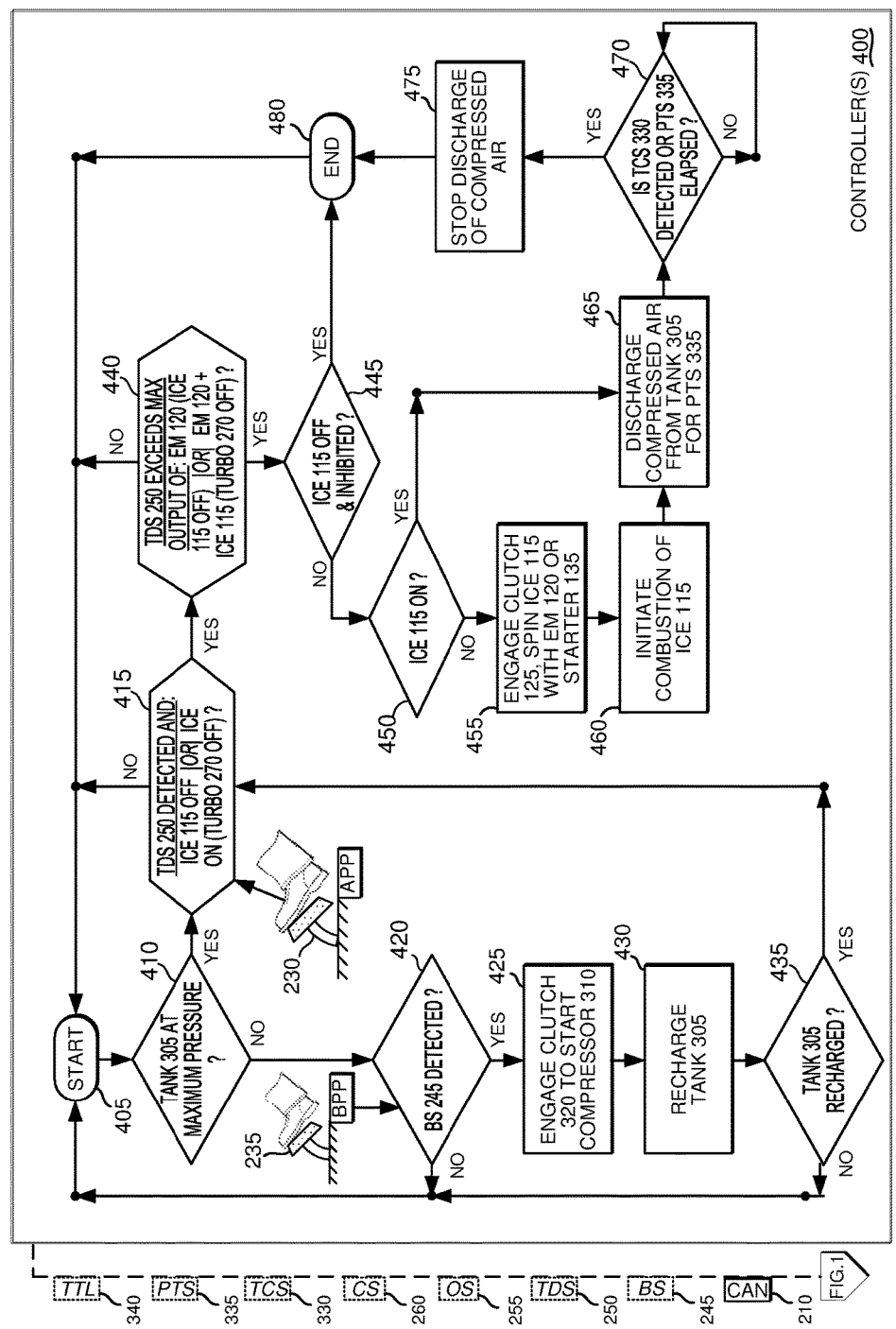
FIG. 2 illustrates certain capabilities and performance aspects of the disclosure depicted in FIG. 1, with components removed and rearranged for purposes of further illustration.

With reference now to the various figures and illustrations and to FIGS. 1, 2, 3, and specifically now to FIG. 1, a schematic diagram of a hybrid electric vehicle (HEV) 100 is shown, and illustrates representative relationships among components of HEV 100. Physical placement and orientation of the components within vehicle 100 may vary. Vehicle 100 includes a driveline 105 that has a powertrain 110, which includes an internal combustion engine (ICE) 115 and an electric machine and/or electric motor/generator/starter (EM) 120, which both generate mechanical and electric power and torque to propel vehicle 100, and power HEV systems and components. Engine 115 is a gasoline, diesel, biofuel, natural gas, and/or alternative fuel powered engine, and/or a fuel cell, which generates an output torque in addition to other forms of electrical, cooling, heating, vacuum, pressure, and hydraulic power by way of vehicle, front end engine accessories (FEADs) and other components as described elsewhere herein. Engine 115 is coupled to electric machine or EM 120 with a disconnect clutch 125. Engine 115 may also generate such power and associated engine output torque for transmission to EM 120 when disconnect clutch 125 is at least partially engaged.

EM 120 may be any one of a plurality of types of electric machines, and for example may be a permanent magnet synchronous motor, electrical power generator, and engine starter 120. For example, when disconnect clutch 125 is at least partially engaged, power and torque may be transmitted from engine 115 to EM 120 to enable operation as an electric generator, and to other components of vehicle 100. Similarly, EM 120 may operate as a starter for engine 115 with disconnect clutch 125 partially or fully engaged to transmit power and torque via disconnect clutch drive shafts 130 to engine 115 to start engine 115, in vehicles that include or do not include an independent engine starter 135.

Further, EM or electric machine 120 may assist engine 115 in a "hybrid electric mode" or an "electric assist mode" by transmitting additional positive torque and propulsion power to turn drive shafts 130 and 140. Also, EM 120 may operate in an electric only mode wherein engine 115 is decoupled by disconnect clutch 125 and shut down, enabling EM 120 to transmit positive or negative torque to EM drive shaft 140 for forward and reverse propulsion of HEV 100. When in generator mode, EM 120 may also be commanded to produce negative torque or power and to thereby generate electricity for charging batteries and powering vehicle electrical systems and components, while engine 115 may be generating propulsion power for vehicle 100 and/or torque for EM 120. EM 120 also may enable energy recovery by regenerative braking, by converting rotational, kinetic energy from powertrain 110 and/or wheels 154 during deceleration, into regenerated electrical energy for storage, in one or more batteries 175, 180, as described in more detail below.

Disconnect clutch 125 may be disengaged to enable engine 115 to stop or to run independently for powering vehicle and engine accessories, while EM 120 generates drive or power and torque to propel vehicle 100 via EM drive shaft 140, torque convertor drive shaft 145, and transmission output drive shaft 150. In other arrangements, both engine 115 and EM 120 may operate with disconnect clutch 125 fully or partially engaged to cooperatively propel vehicle 100 through drive shafts 130, 140, 150, differential 152, and wheels 154. Driveline 105 may be further modified to enable regenerative braking from one or more and any wheel(s) 154 using a selectable and/or controllable differential torque capability.

Drive shaft 130 of engine 115 and EM 120 may be a continuous, single, through shaft that is part of, and integral with EM drive shaft 140, or may be a separate, independent drive shaft 130 that may be configured to turn independently of EM drive shaft 140, for powertrains 110 that include multiple, inline, or otherwise coupled EM 120 configurations. The schematic of FIG. 1 also contemplates alternative configurations with more than one engine 115 and/or EM 120, which may be offset from drive shafts 130, 140, and where one or more of engines 115 and EMs 120 are positioned in series and/or in parallel elsewhere in driveline 105. Driveline 105 and powertrain 110 also include a transmission 160 that includes a torque convertor (TC) 155, which couples engine 115 and EM 120 of powertrain 110 with and/or to a transmission 160. TC 155 may further incorporate a bypass clutch and clutch lock 157.

Powertrain 110 and/or driveline 105 further include one or more batteries 175, 180. One or more such batteries can be a higher voltage, direct current battery or batteries 175 operating in ranges between about 48 to 600 volts, and sometimes between about 140 and 300 volts or more or less, which is/are used to store and supply power for EM 120 and during regenerative braking, and for other vehicle components and accessories. Other batteries can be a low voltage, direct current battery(ies) 180 operating in the range of between about 6 and 24 volts or more or less, which is/are used to store and supply power for starter 135 to start engine 115, and for other vehicle components and accessories.

Batteries 175, 180 are respectively coupled to engine 115, EM 120, and vehicle 100, as depicted in FIG. 1, through various mechanical and electrical interfaces and vehicle controllers, as described elsewhere herein. High voltage EM battery 175 is also coupled to EM 120 by one or more of a motor control module (MCM), a battery control module (BCM), and/or power electronics 185, which may include power invertors and are configured to condition direct current (DC) power provided by high voltage (HV) battery 175 for EM 120. MCM/BCM/power electronics 185 are also configured to condition, invert, and transform DC battery power into single and multiple phase, such as for example, single, two, and/or three phase, alternating current (AC) as may be typically required to power electric machine or EM 120. MCM/BCM/power electronics 185 is/are also configured to charge one or more batteries 175, 180 with energy generated by EM 120 and/or front end accessory drive components, and to supply power to other vehicle components as needed.

Vehicle 100 may also incorporate one or more brakes 190 coupled to wheels 154 and brake system control module (BSCM) 195. Brakes 190 and BSCM 195 may be operative to mechanically and/or electrically decelerate wheels 154, and to enable regenerative braking to recover and capture deceleration energy from wheels 154, and in cooperation with MCM/BCM 185, and possibly other controllers, EM 120, and other components, enables charging of HV battery (ies) 175 and other batteries 180, and other power storage components.

For further example, various other vehicle functions, actuators, and components may be controlled by the controllers within the vehicle systems and components, and may receive signals from other controllers, sensors, and actuators, which may include, for purposes of illustration but not limitation, fuel injection timing and rate and duration, throttle valve position, spark plug ignition timing (for spark-ignition engines), intake/exhaust valve timing and duration, front-end accessory drive (FEAD) components, transmission oil pumps, a FEAD alternator or generator, EM 120, high and low voltage batteries 175, 180, turbocharger(s) and turbo charge lag reduction assemblies, and various sensors for battery charging or discharging (including sensors for deriving, predicting, or establishing the maximum charge, state of charge—SoC, and discharge power limits), temperatures, voltages, currents, and battery discharge power limits, clutch pressures for disconnect clutch 125, bypass/launch clutch 157, TC 155, transmission 160, and other components.

With continued reference to FIG. 1, vehicle 100 further includes one or more controllers and computing modules and systems, in addition to MCM/BCM/power electronics 185, which enable a variety of vehicle capabilities. For example, vehicle 100 may incorporate a body control module and/or a body system controller, such as a vehicle system controller (VSC) 200 and a vehicle computing system (VCS) and controller 205, which are in communication with MCM/BCM 185, other controllers, and a vehicle network such as a controller area network (CAN) 210, and a larger vehicle control system and other vehicle networks that include other micro-processor-based controllers as described elsewhere herein. CAN 210 may also include network controllers in addition to communications links between controllers, sensors, actuators, and vehicle systems and components.

Such CAN or CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

While illustrated here for purposes of example, as discrete, individual controllers, MCM/BCM 185, VSC 200 and VCS 205 may be individual units, part of a single unit, and/or parts of multiple such units, and may control, be controlled by, communicate signals to and from, and exchange data with other units, subunits, and controllers, and other sensors, actuators, signals, and components, which are part of the larger HEV and control systems and internal and external networks. The capabilities and configurations described in connection with any specific micro-processorbased controller(s) as contemplated herein, may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers both in the singular and plural connotations, and individually, collectively, and in various suitable cooperative and distributed processing and control combinations.

Further, communications over the network and CAN 210 are intended to include responding to, sharing, transmitting, and receiving of commands, signals, data, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, MCM/BCM 185, VSC 200, VCS 205, CAN 210, and other controllers, may be and may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing and communicating data With continuing attention to FIG. 1, HEV 100 also may include a powertrain control unit/module (PCU/PCM) 215 coupled to VSC 200 or another controller, and coupled to CAN 210 and engine 115, and EM 120 to control each powertrain component. An engine control module (ECM) or unit (ECU) or energy management system (EMS) 225 may also be included having respectively integrated controllers and be in communication with CAN 210, and is coupled to engine 115 and VSC 200 in cooperation with PCU 215 and other controllers.

In these configurations and variations, VSC 200, VCS 205, and other controllers cooperatively manage and control the vehicle components and other controllers, sensors, and actuators. For example, the controllers may communicate control commands, logic, and instructions and code, data, information, and signals to and/or from engine 115, disconnect clutch 125, EM 120, TC 155, transmission 160, batteries 175, 180, and MCM/BCM/power electronics 185, and other components and systems. The controllers also may control and communicate with other vehicle components and external systems known to those skilled in the art, even though not shown in the figures.

The embodiments of vehicle 100 in FIG. 1 also depict exemplary sensors and actuators in communication with vehicle network and CAN 210 that can transmit and receive signals to and from VSC 200, VCS 205, and other controllers. In further examples, vehicle 100 may include an accelerator position and motion sensor (APP) 230, a brake pedal position and motion sensor (BPP) 235, and other driver controls and vehicle profile and performance parameters (VPP) 240, which may include driver selectable vehicle performance preference profiles and parameters, and driver selectable vehicle operational mode sensors and related profile parameters and settings.

Such profile parameters and settings may include profile parameters, which may be driver selectable and which may establish various preferred and/or predetermined vehicle performance characteristics and driver profile preferences, as described elsewhere herein. BPP 235 may be further cooperatively coupled to and communicate with other systems, controllers, and sensors including for example brakes 190 and BSCM 195, and configured to generate a braking signal (BS) 245. Vehicle 100 may also have VCS 205 configured as and/or with one or more communications, navigation, and other sensors, as described with respect to the SYNC onboard vehicle computing system manufactured by the Ford Motor Company, and other similar systems (See, for example, SmartDeviceLink.com, openXCplatform.com, www.ford.com, U.S. Pat. Nos. 9,080,668, 9,042,824, 9,092, 309, 9,141,583, 9,141,583, 9,680,934, and others). VCS 205 can cooperate with VSC 200 and other controllers to manage and control vehicle 100 in response to sensor and communication signals identified, established by, and received from these and similar vehicle systems and components.

Further, vehicle 100 may have VCS 205 configured with one or more communications, navigation, and other sensors. The VCS 205 can cooperate in parallel, in series, and distributively with VSC 200, and other controllers to manage and control the vehicle 100 in response to sensor and communication signals identified, generated by, established by, communicated to, and received from such vehicle systems and components. Such parameters, profiles, and settings of such profiles, may be driver selectable, adjustable, and viewable through a vehicle user interface of an onboard vehicle computing system, such as the above-noted Ford SYNC system, which be a part of, work in connection with, and/or incorporated as VCS 205, and other controllers and systems.

HEV 100 utilizes such sensors, parameters, and settings to enable performance control and enhancement capabilities, in conjunction with the one or more controllers that are configured to manage these performance control and enhancement capabilities. For example, signals from a driver and various HEV components such as MCM/BCM 185 and APP 230, may demand power from ICE 115 and/or EM 120, and may be embedded in and/or cause the controller(s) to generate a torque demand signal (TDS) 250. In addition to BS 245 and TDS 250, the controllers may also generate various other signals (OS) 255 and HEV control signals (CS) 260, which are utilized to communicate data to, between, and from various HEV components, sensors, systems, and controllers. Further, the controllers may embed information in and extract information from braking signal 245, TDS 250, OS 255, CS 260, and other signals, and may also communicate directly with other vehicle controllers, sensors, actuators, systems, and components, to enable various communications and operations.

ICE 115 may also include an engine air intake, such as an engine air intake manifold 265 coupled to a turbocharger 270. Engine air intake manifold 265 may be configured as and/or incorporate an intercooler assembly that cools and/or adjusts a temperature of ingested air. Turbocharger 270 includes an intake air compressor turbine 275 rotationally coupled to an engine exhaust turbine 280 that is driven by exhaust from ICE 115. During operation, the intake air compressor turbine 275 communicates compressed air downstream to the intake manifold 265, and when feathered or non-operational, upstream ambient air is communicated downstream to the manifold 265.

HEV 100 also includes a turbo lag reduction assembly 300 having a compressed air pressure tank 305 coupled to an auxiliary compressor 310, which is driven by a drive shaft coupler 315. Coupler 315 may be belt and/or gear driven by drive shaft 130 and/or another component of HEV 100, and may further include a clutch 320 configured to be selectively engaged to power auxiliary compressor 310. When powered, compressor 310 delivers pressurized air to pressure tank 305 for storage. When clutch 320 is engaged in response to BS 245, some or all of the braking deceleration power from rotating wheels 154 is captured from drive shaft 130 or another component of drive line 105, which power is communicated to auxiliary compressor 310. This enables recharging of pressure tank 305 with compressed air, without consumption of power from any other power source of HEV 100.

One or more of the various controllers, such as for example PCU 215 and/or BSCM 195 may be configured to engage clutch 320 in response to BS 245 and/or another of the signals. Further, the controller(s) may be configured to also disengage clutch 320 when BS 245 is terminated or discontinued, and/or when pressure tank 305 is charged to a predetermined volume and/or pressure of compressed air. Pressure tank 305 may also include one or more pressure and/or volumetric flow rate sensors, which may generate a signal when the predetermined volume and/or pressure is attained, such that the controller(s) in response to the signal, disengage the clutch 320 to power off the auxiliary compressor 310.

Other arrangements include the controller(s) or at least one controller, configured to respond to TDS 250, and to discharge compressed air from pressure tank 305 to an engine air intake, such as one or more of intake manifold 265, compressor turbine 275, exhaust turbine 280, and/or combinations thereof, and to spin the turbines 275, 280 such that operational rotational speeds are rapidly achieved for the turbocharger. The discharged compressed air also increases an air mass flow rate to an engine air intake, such as one or more of the engine intake manifold 265, and/or the turbines 275, 280.

In further arrangements, one or more fixed orifice, proportional, and/or selectable solenoid valves 325 may be included and/or actuated to adjust compressed air discharge to and/or between an engine air intake, such as manifold 265, and turbines 275, 280. Such a valve or valves couple pressure tank 305 to one or more of an upstream location of intake compressor turbine 275, a location upstream of engine air intake manifold 265 that is also downstream of compressor turbine 275, and/or a location proximate to engine exhaust turbine 280, or other suitable locations about ICE 115.

Additionally, the controller(s) are configured, in response to TDS 250 to discharge a volume of compressed air from pressure tank 305 thereto until a sensor and/or controller(s) generate and/or receive a turbo charge limit signal (TCS) 330, which may be generated and/or received as the turbines 275, 280 near and/or reach predetermined and operational rotational speeds. Another variation includes the controller(s) being responsive to TDS 250 and configured to discharge compressed air from pressure tank 305 directly and/or via valve(s) 325, to an engine air intake, such as one or more of intake manifold 265, and/or turbines 275, 280 for a predetermined time span (PTS) 335 that may be established by a turbo time lag (TTL) 340.

TCS 330 may be predetermined, preselected, predicted, and/or historically determined, and may be received, communicated, and/or stored between controller(s) and/or VPP 240 and external sources. TCS 330 may be configured to establish an optimal operating speed, output pressure of intake compressor turbine, pressure and/or temperature of exhaust turbine, and other performance parameters of turbocharger 270.

TTL 340 may be established as a function of the performance characteristics and capabilities of ICE 115 and turbocharger 270, as well as instantaneous ICE 115 and turbocharger 270 operating conditions, power demanded by TDS 250 and other signals, and ambient environmental conditions, among other parameters, conditions, and variables. The controller(s) may be further configured to select TTL 340 from a database of TTLs that may be received from external courses and from internal data storage and historical stored TTLs 340, which may be stored in VPP 240. Also, the controller(s) may predict TTL 340 in view of stored, remotely received, and/or historical TTLs 340.

PTS 335 may be adjusted as a function of these exemplary TTLs 340 such that compressed air is discharged for PTS 335 to establish the optimal volume and pressure of discharged air, such that TTL 340 may be achieved, minimized, and optimally adjusted to maximize and/or optimize the performance of turbocharger 270. In this way, the predetermined volume of discharged compressed air is established by one of current, instantaneous, and/or historical operating and performance parameters, conditions, and/or variables of ICE 115, turbocharger 270, and the ambient environment (temperature, pressure, humidity, altitude, etc.), including for example the TCS 330, TTLs 340, and others.

With continuing reference to FIG. 1, during electric only operation of HEV 100, and in response to TDS 250 exceeding the maximum output capacity of EM 120, one or more of the controllers are further configured to actuate various components such as clutch 125, and to adjust output torque of EM 120 to spin or spool up ICE 115 to a target speed that improves the efficiency of starting ICE 115. Once the target speed is achieved, the controller(s) initiate combustion of ICE 115, and thereafter and/or concurrently, the controller(s) discharge the volume of compressed air from the pressure tank 305, and to an engine air intake, such as one or more of intake manifold 265, and/or turbocharger turbines 275, 280, until TCS 330, or another of the signals, is received. Additionally, during highway, vehicle passing, and/or other high-performance HEV operations, when ICE 115 is running without turbocharging, that is turbocharger 270 is not operating, and in response to TDS 250 exceeding combined power available from ICE 115 and/or EM 120, the controller(s) may also discharge pressurized air from pressurized tank 305 to enable pre-operational and operational spool-of turbocharger 270, which enables reduction of spool-up lag.

With reference now also to FIG. 2, as well as to FIG. 1, the disclosure also contemplates methods of controlling HEV 100 utilizing any of the various controller(s) already described, which may be represented for example in FIG. 2 as controller(s) 400, and which are configured to generate, send, receive, store, and adjust the various signals, parameters, and variables depicted and described here and elsewhere herein. As the controller(s) execute(s) such methods starting at step 405, pressure tank 305 is monitored at step 410 to detect whether tank 305 maintains a maximum capacity of stored pressurized or compressed air. If pressure tank 305 is pressurized to capacity, then control passes to step 415 to monitor for TDS 250.

If at step 410, pressure tank 305 is detected to have below or less than maximum pressurization or capacity, then control passes to step 420, which enables monitoring of CAN 210 and other controller(s) and sensor(s), to detect BS 245 from one or more of BPP 235, brakes 190, and/or BSCM 195. Unless BS 245 is detected, control returns again to start step 405. If BS 245 is detected, and since pressurization of tank 305 is below capacity, then turbocharger lag reduction assembly 300 is actuated at step 425, and clutch 320 is engaged, which captures braking deceleration power from drive shaft 130 as brakes 190 are actuated. This in turn at step 430 actuates auxiliary compressor 310 and initiates recharging of pressure tank 305. During recharging of tank 305, pressurization is monitored at step 435, and if tank 305 is not recharged, then control returns to start step 405, or another suitable step, such as for example step 420, to monitor for BS 245 persistence or termination, and maximum pressure of tank 305 at steps 410 and/or 435.

Once tank 305 is recharged by lag reduction assembly 300, as monitored at steps 410 and 435 and other steps, then control passes to step 415, to monitor for TDS 250. If TDS 250 is not detected or if ICE 115 is already started and powered on with turbocharger 270 operating, then control moves again to start step 405. If TDS 250 is detected and ICE 115 is off, or if ICE 115 is on and turbocharger 270 is not operating, then control passes to step 440. At step 440, the controller(s) detect(s) if TDS 250 exceeds the maximum output of: (a) HEV 100 is in electric only mode of operation with ICE 115 off, or if the combined power of both EM 120 and ICE 115 with turbocharger 270 off. If HEV 100 is not in electric only mode, and ICE 115 is already be powered on with turbocharger 270 already spinning at an operationally suitable speed, then turbo spool-up lag time reductions may not be needed, and control may pass back to start step 405.

Also, if TDS 250 does not exceed the maximum power output capacity of EM 120 or the combination of EM 120 plus ICE 115 without turbocharging, then control returns to start step 405, since EM 120 and/or the combination of EM 120 and non-turbocharged ICE 115 has(ve) the capacity to meet the propulsion and power demanded by TDS 250. Otherwise, control passes to step 445 to detect whether ICE 115 is off and start of ICE 115 is inhibited, which if so enables control to pass to end step 480 and to return control back to start step 405. If ICE 115 is already powered on, then control passes to the "NO" branch and to step 450. Start of ICE 115 may be inhibited under various HEV 100 operating conditions, which may include for example various energy conservation modes of operation, and/or automated HEV 100 cruise control capabilities, among other possible modes of operation.

If ICE 115 is off and start is not inhibited at step 445, and ICE 115 is off at step 450, then control proceeds to step 455, and drive shaft clutch 125 is engaged, EM 120 may preferably spin ICE 115 to a predetermined, pre-combustion rotational target speed to enable efficient start of ICE 115, which may or may not be needed if an independent FEAD starter 135 is available and/or utilized. Control then proceeds to steps 460 and 465 to initiate combustion of ICE 115 before and/or concurrently, while compressed air is discharged from pressurized tank 305 for PTS 335, to one or more of the noted engine air intakes 265, 275, or exhaust turbine 280.

Although depicted here to be sequential, steps 460 and 465 may also be adjusted to be concurrent and/or overlapping in time of initiation, as may be determined by various HEV 100 performance configurations and/or modes of operation. Additionally, during steps 460 and 465, valve(s) such as valve(s) 325 may be differentially and variably adjusted if optionally preferred, to enable distribution of compressed to increase the air mass flow rate to one or more of engine intake manifold 265 and/or turbines 275, 280, which in turn reduces spool-up lag time of turbocharger 270. When at step 450, ICE 115 is determined to be operational, control passes to step 465, and such valve adjusted mass air flow rates are optimally configured to reduce turbo spool-up lag.

During combustion start of ICE 115, and when at step 450, ICE 115 is determined to be running, control continues to step 470 to monitor for and detect TCS 330 and whether PTS 335 has elapsed. Once TCS 330 is detected and PTS 335 has elapsed, which indicates that turbocharger 270 has attained operational speeds, whether a predetermined volume of compressed air has been discharged, and/or whether tank 305 is completely discharged, then discharge of compressed air is discontinued at step 475, and control passes to end step 480 as the method completes a cycle of operation, thereby enabling a reduction of spool-up lag time of turbocharger 270. Thereafter, control proceeds from end step 480 and returns to start step 405 for continued monitoring and processing of the method steps.

These described capabilities of the disclosure enable recovery of braking deceleration energy, which improves performance of HEV 100 by reducing the lag often experienced during turbocharger spool up, and by reducing and/or eliminating any potential for otherwise required ICE pumping work and back pressure energy losses of ICE 115 during pressure tank recharge. Further, utilizing recovered braking energy reduces possible wear on friction brake components of brakes 190, and consequently lost energy dissipated as heat in brakes 190.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
   an engine coupled to a turbo lag reduction assembly having an auxiliary compressor and pressure tank that are coupled to a clutch driven by a driveshaft powered by vehicle wheel rotation;
   a turbocharger having an engine exhaust turbine rotationally coupled to an engine intake compressor turbine, wherein the pressure tank is coupled to an upstream location of the engine intake compressor turbine and is configured to store and discharge a predetermined volume of compressed air to spin the engine intake compressor turbine; and
   at least one controller configured to:
   engage the clutch responsive to a braking signal, until the compressor has recharged the pressure tank.

2. The vehicle according to claim 1, further comprising:
the at least one controller configured to disengage the clutch in response to one of termination of the braking signal and the pressure tank being recharged with compressed air.

3. The vehicle according to claim 1, further comprising:
the at least one controller configured, in response to an engine torque demand signal, to discharge compressed air from the pressure tank to an intake manifold of the engine.

4. The vehicle according to claim 1, further comprising:
the at least one controller configured, in response to an engine torque demand signal, to discharge a volume of compressed air from the pressure tank to an intake manifold of the engine, until a turbo charge limit signal is received.

5. The vehicle according to claim 1, further comprising:
the at least one controller configured, in response to an engine torque demand signal, to discharge compressed air from the pressure tank to an intake manifold of the engine for a predetermined time span established by a turbo time lag that results from instantaneous engine and environmental parameters.

6. The vehicle according to claim 1, further comprising:
the at least one controller configured, in response to an engine torque demand signal, to discharge a predetermined volume of compressed air from the pressure tank to an intake manifold of the engine, wherein the predetermined volume of compressed air is established by one of current and historical parameters of the engine, turbocharger, and environment.

7. The vehicle according to claim 1, further comprising:
an electric machine (EM) coupled to the engine; and
the at least one controller configured to, in response to a torque demand signal during electric only operation that exceeds EM output capacity:
adjust output torque of the EM to spin the engine to a target speed,
initiate engine combustion in response to attaining the target speed, and
discharge a volume of compressed air from the pressure tank to an intake manifold of the engine, once combustion is initiated, and until a turbo charge limit signal is received.

8. The vehicle according to claim 1, further comprising:
a turbocharger having an engine exhaust turbine coupled to an engine intake compressor turbine; and
the pressure tank being further coupled to an engine intake manifold downstream of the engine intake compressor turbine.

9. The vehicle according to claim 1, further comprising:
a turbocharger coupled to the engine and having an engine exhaust turbine rotationally coupled to an engine intake compressor turbine; and
the pressure tank being configured to store a volume and pressure of compressed air and to discharge the compressed air to increase an air mass flow rate to one or more of an engine intake manifold and the engine intake compressor turbine.

10. A vehicle, comprising:
an electric machine coupled to a turbo lag reduction assembly having an auxiliary compressor and pressure tank coupled to a clutch driven by a driveshaft powered by vehicle wheel rotation; and
at least one controller configured to:
engage the clutch responsive to a braking signal, until the compressor has recharged the pressure tank, and
discharge the tank to an engine intake responsive to a torque demand signal exceeding electric machine capacity.

11. The vehicle according to claim 10, further comprising:
an engine coupled to the electric machine (EM), turbo lag reduction assembly, and driveshaft; and
the at least one controller configured to, in response to a torque demand signal during electric only operation exceeding EM output capacity:
adjust output torque of the EM to spin the engine to a target speed,
initiate engine combustion in response to attaining the target speed, and
discharge a volume of compressed air from the pressure tank to the engine intake, once combustion is initiated, and until a turbo charge limit signal is received.

12. The vehicle according to claim 10, further comprising:
the at least one controller configured, in response to an engine torque demand signal, to discharge compressed air from the pressure tank to an intake manifold of an engine for a predetermined time span established by a turbo time lag that results from instantaneous engine and environmental parameters.

13. The vehicle according to claim 10, further comprising:
the at least one controller configured, in response to an engine torque demand signal, to discharge a predetermined volume of compressed air from the pressure tank to an intake manifold of the engine, wherein the predetermined volume is established by one of current and historical parameters of the engine, turbocharger, and environment.

14. The vehicle according to claim 10, further comprising:
a turbocharger coupled to the engine and having an engine exhaust turbine rotationally coupled to an engine intake compressor turbine upstream from an engine intake manifold; and
the pressure tank being configured to store a volume and pressure of compressed air and to discharge the compressed air to increase an air mass flow rate to one or more of the engine intake manifold and the engine intake compressor turbine.

15. A method of controlling a vehicle, comprising:
by at least one controller, coupled with an electric machine and a turbo lag reduction assembly having an auxiliary compressor and pressure tank coupled to a clutch driven by a wheel powered driveshaft; and
engaging the clutch responsive to a braking signal, until the compressor recharges the pressure tank, and
discharging the tank to an engine intake responsive to a torque demand signal exceeding electric machine capacity.

16. The method of controlling the vehicle according to claim 15, further comprising:
by the at least one controller, further coupled to an engine, and in response to a torque demand signal during electric only operation exceeding an output capacity of the electric machine (EM):
adjusting output torque of the EM to spin the engine to a target speed,
initiating engine combustion in response to attaining the target speed, and
discharging a volume of compressed air from the pressure tank to the engine intake, once combustion is initiated, and until a turbo charge limit signal is received.

17. The method of controlling the vehicle according to claim 15, further comprising:
   by the at least one controller, in response to an engine torque demand signal,
      discharging compressed air from the pressure tank to an intake manifold of an engine for a predetermined time span established by a turbo time lag that results from instantaneous engine and environmental parameters.

18. The method of controlling the vehicle according to claim 15, further comprising:
   by the at least one controller, in response to an engine torque demand signal,
      discharging a predetermined volume of compressed air from the pressure tank to an intake manifold of the engine, wherein the predetermined volume is established by one of current and historical parameters of the engine, turbocharger, and environment.

19. The method of controlling the vehicle according to claim 15, further comprising:
   by the at least one controller, further coupled with a turbocharger having an engine exhaust turbine rotationally coupled to an engine intake compressor turbine upstream from an engine intake manifold, and in response to an engine torque demand signal,
   storing a volume and pressure of compressed air, and
   discharging compressed air from the pressure tank to increase an air mass flow rate to one or more of the engine intake manifold, engine intake compressor turbine, and engine exhaust turbine.

\* \* \* \* \*